(12) United States Patent
Jaradi et al.

(10) Patent No.: US 11,718,346 B2
(45) Date of Patent: Aug. 8, 2023

(54) CABLE WHEEL DEFLECTOR

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Saeed D. Barbat, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/544,135

(22) Filed: Dec. 7, 2021

(65) Prior Publication Data

US 2023/0174157 A1 Jun. 8, 2023

(51) Int. Cl.
*B62D 21/15* (2006.01)
*B60R 19/00* (2006.01)

(52) U.S. Cl.
CPC ............. *B62D 21/15* (2013.01); *B60R 19/00* (2013.01); *B60R 2019/002* (2013.01); *B60R 2019/005* (2013.01)

(58) Field of Classification Search
CPC ........ B62D 21/15; B62D 25/16; B60R 19/00; B60R 2019/002; B60R 2019/005; B60R 22/46
See application file for complete search history.

(56) References Cited

U.S. PATENT DOCUMENTS

| | | | |
|---|---|---|---|
| 6,286,867 B1 | 9/2001 | Braemig et al. | |
| 6,631,942 B1 | 10/2003 | Kitagawa | |
| 8,672,383 B2 * | 3/2014 | Crane | B62D 27/00 |
| | | | 296/29 |
| 9,126,629 B2 * | 9/2015 | Gilbert | B62D 25/025 |
| 2015/0210315 A1 * | 7/2015 | Maier | B62D 9/00 |
| | | | 180/280 |

FOREIGN PATENT DOCUMENTS

| | | | | |
|---|---|---|---|---|
| AT | 516603 B1 * | 7/2016 | | |
| DE | 3736949 A1 | 7/1988 | | |
| DE | 10113098 A1 * | 9/2002 | | B60G 7/02 |
| DE | 102010025202 A1 | 12/2011 | | |
| DE | 102014018760 B3 | 2/2016 | | |
| JP | 2007537926 A * | 12/2007 | | |

OTHER PUBLICATIONS

Description translation for DE 10113098 from Espacenet (Year: 2002).*

* cited by examiner

*Primary Examiner* — James M Dolak
*Assistant Examiner* — Daniel M. Keck
(74) *Attorney, Agent, or Firm* — Frank A. MacKenzie; Bejin Bieneman PLC

(57) ABSTRACT

A vehicle includes a vehicle body defining a front wheel well. The vehicle body includes a rear wall vehicle-rearward of the front wheel well. The vehicle includes one or more cables supported at the rear wall. The cables are movable from a slack position to a taut position. The vehicle includes a pyrotechnic actuator operatively coupled to the cables to move the cables from the slack position to the taut position upon actuation of the pyrotechnic actuator.

18 Claims, 10 Drawing Sheets

CABLE WHEEL DEFLECTOR

BACKGROUND

During an offset frontal impact of a vehicle, a direction of the impact is offset from major structural components of the vehicle. Offset front impacts can be simulated with a small offset rigid barrier (SORB) frontal crash test. For example, the Insurance Institute for Highway Safety (IIHS) sets a standard for a SORB frontal crash test in which the vehicle impacts a rigid barrier at 40 miles/hour with 25% of an outer portion of the vehicle overlapping the rigid barrier.

In this frontal offset impact mode, various suspension and steering components will move relative to one another as deformation progresses in crash.

DETAILED DESCRIPTION

Figure 1:
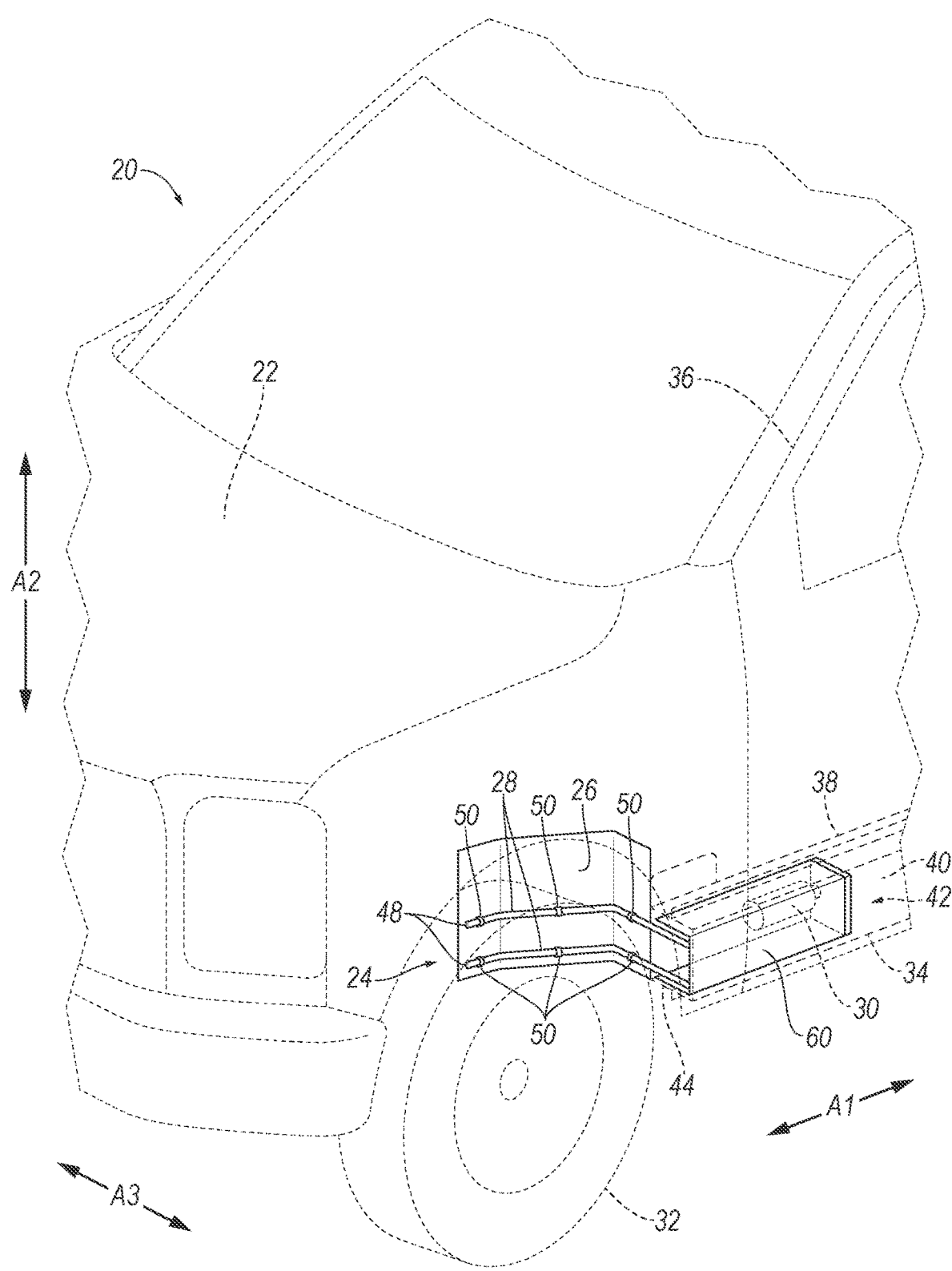
FIG. 1 is a perspective view of a vehicle with cables in a slack position at a rear wall of a front wheel well of a vehicle body.

A vehicle includes a vehicle body defining a front wheel well, the vehicle body including a rear wall vehicle-rearward of the front wheel well. The vehicle includes a cable supported at the rear wall, the cable movable relative to the vehicle body from a slack position to a taut position. The vehicle includes a pyrotechnic actuator operatively coupled to the cable to move the cable from the slack position to the taut position upon actuation of the pyrotechnic actuator.

The vehicle may include a second cable supported at the rear wall, the second cable movable from a second slack position to a second taut position, the pyrotechnic actuator operatively coupled to the second cable to move the second cable from the second slack position to the second taut position upon actuation of the pyrotechnic actuator.

The cable and the second cable may be spaced from each other along a vertical axis.

The cable may be elongated perpendicular to a vehicle-vertical axis.

The cable in the slack position may be at the rear wall and the cable in the taut position may be spaced from the rear wall.

The cable in the taut position may be vehicle-forward of the cable in the slack position.

The cable in the taut position may extend transversely to both a vehicle-longitudinal axis and a cross-vehicle axis.

The vehicle may include a shuttle connected to the cable and slidable from a first position to a second position, the cable being at the slack position when the shuttle is at the first position and at the taut position when the shuttle is at the second position.

The shuttle in the first position may be vehicle-forward of the second position.

The shuttle may be movable from the first position to the second position along a rocker of the vehicle body.

The shuttle may be disposed within the rocker.

The pyrotechnic actuator may be operatively coupled to the shuttle and the vehicle body to move the shuttle relative to the vehicle body.

The vehicle may include a lock engageable with the shuttle in the second position to maintain the shuttle at the second position.

The vehicle may include a spring and a pin supported by one of the vehicle body and the shuttle, the spring urging the pin toward the other of the vehicle body and the shuttle, and the other of the vehicle body and the shuttle defining a hole positioned to receive the pin as the shuttle moves from the first position to the second position.

The vehicle may include a ratchet tooth supported by the vehicle body and positioned to engage the shuttle in the second position.

The ratchet tooth may be positioned to engage a vehicle-forward edge of the shuttle at the second position.

The vehicle may include a plurality of retainers fixed to the rear wall and engaged with the cable in the slack position.

The cable in the taut position may be disengaged from the plurality of retainers.

The cable may be fixed to the vehicle body vehicle-forward of the rear wall in the slack position and in the taut position.

With reference to the Figures, wherein like numerals indicate like parts throughout the several views, a vehicle 20 includes a vehicle body 22 defining a front wheel well 24. The vehicle body 22 includes a rear wall 26 vehicle-rearward of the front wheel well 24. The vehicle 20 includes one or more cables 28 supported at the rear wall 26. The cables 28 are movable from a slack position to a taut position. The vehicle 20 includes a pyrotechnic actuator 30 operatively coupled to the cables 28 to move the cables 28 from the slack position to the taut position upon actuation of the pyrotechnic actuator 30.

Figure 3:
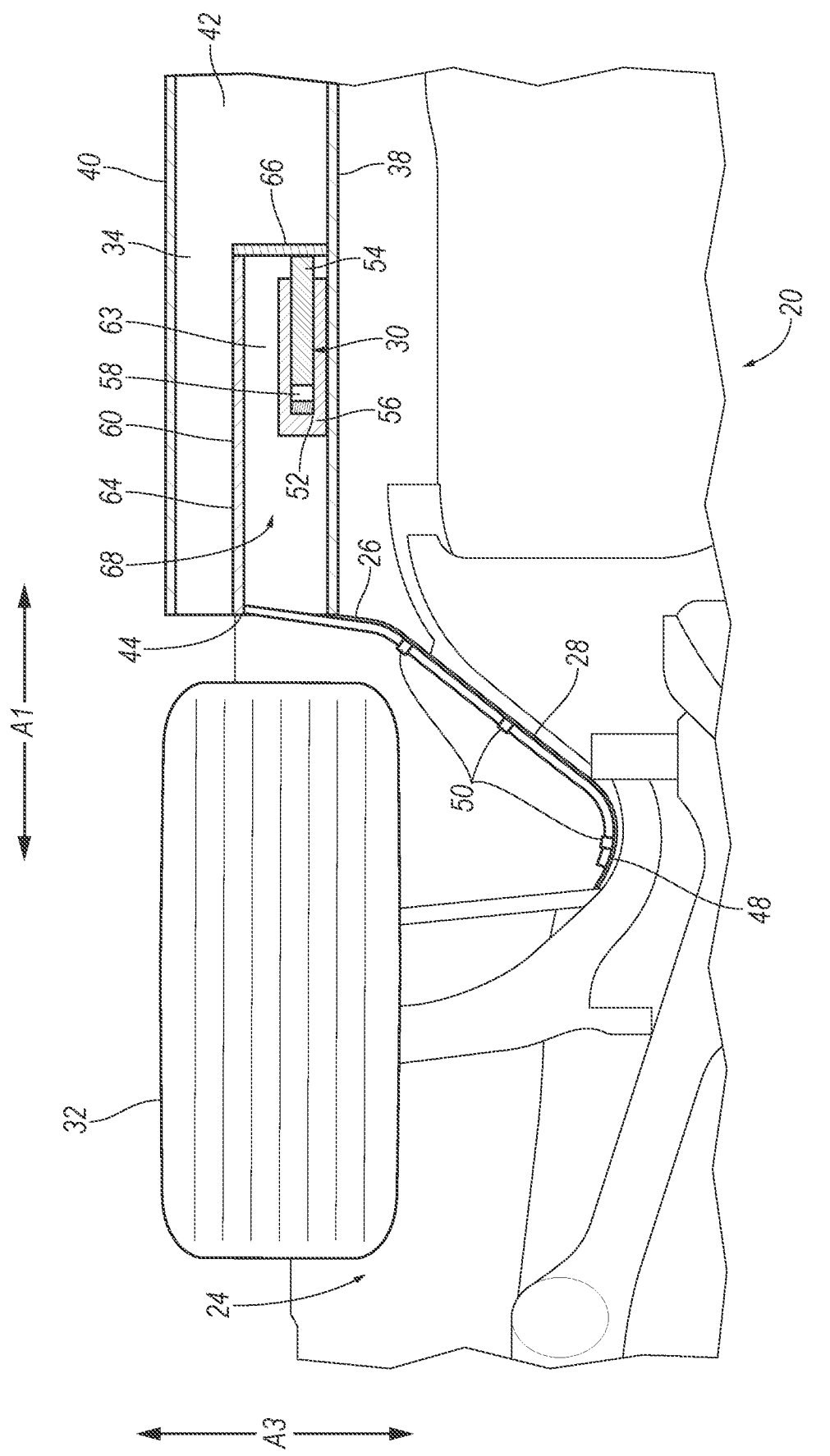
FIG. 3 is a bottom view of the vehicle with the cables in the slack position and a cross-section of the rocker and pyrotechnic actuator.

During a frontal impact of the vehicle 20, e.g., a small-offset rigid-barrier (SORB) frontal crash test as shown in FIG. 3, the cables 28 move to the taut position, which deflects a vehicle-rearward end of a wheel 32 of the vehicle 20 outboard, i.e., cross-vehicle away from the front wheel well 24. In other words, the cables 28 in the taught position operate as a wheel deflector. Specifically, when an impact is detected the pyrotechnic actuator 30 is actuated and the cables 28 are moved from the slack position to the taut position, e.g., away from the rear wall 26 and toward the wheel 32. Normal forces acting on the wheel 32 from the cables 28 urge the wheel 32 outboard of the front wheel well 24.

In the present application, relative vehicular orientations and directions by way of example, top, bottom, front, rear, outboard, inboard, inward, outward, lateral, left, right, etc., are from the perspective of an occupant seated in the vehicle facing forward, e.g., toward a forward instrument panel and/or forward windshield of the vehicle. The forward direction of the vehicle is the direction of movement of the vehicle when the vehicle is engaged in forward drive with wheels of the vehicle straight. Orientations and directions relative to the assembly are given related to when the assembly is supported by the vehicle as described below and shown in the Figures.

The vehicle body 22 may be of a unibody construction in which a vehicle frame is unitary with the vehicle body 22 (including rockers 34, pillars 36, roof rails, etc.), as shown in the example in the Figures. As another example, the vehicle body 22 and vehicle frame may have a body-on-frame construction (also referred to as a cab-on-frame construction) in which the vehicle body 22 and vehicle frame are separate components, i.e., are modular, and the vehicle body 22 is supported on and affixed to the vehicle frame. Alternatively, the vehicle 20 frame and vehicle body 22 may have any suitable construction. The vehicle frame and vehicle body 22 may be of any suitable material, for example, steel, aluminum, and/or fiber-reinforced plastic, etc.

Figure 2:
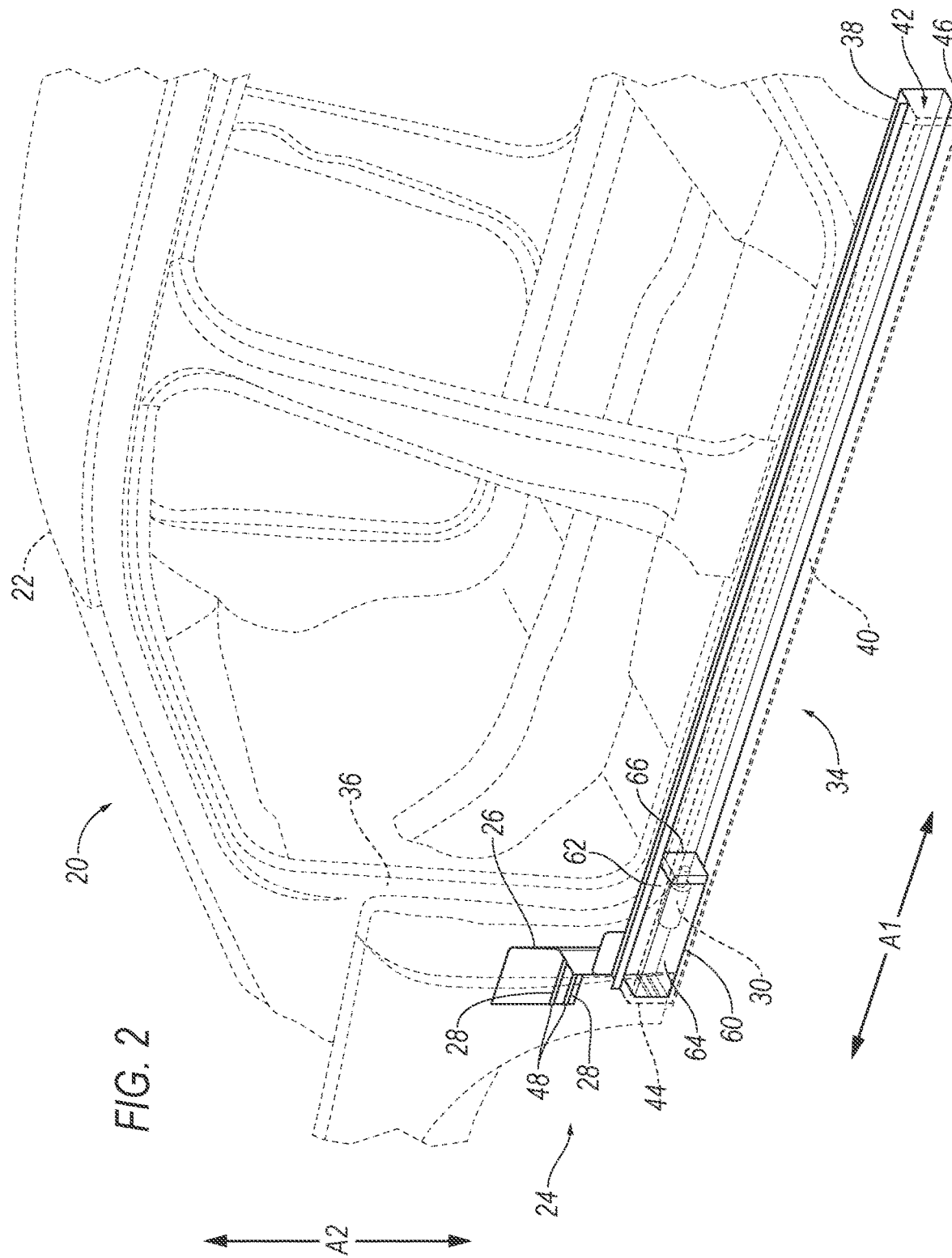
FIG. 2 is a perspective view of the vehicle including a pyrotechnic actuator supported by a rocker and coupled to the cables.

The vehicle body 22 may include the rockers 34, as introduced above. The rockers 34 may be at the lower-most and outer-most portion of the vehicle body 22, as shown in the example in the Figures. The rocker 34 is elongated from one front wheel well 24 rearwards, e.g., to one rear wheel well, as shown in FIG. 2. Specifically, the rocker 34 is elongated along a vehicle-longitudinal axis A1.

Figure 4:
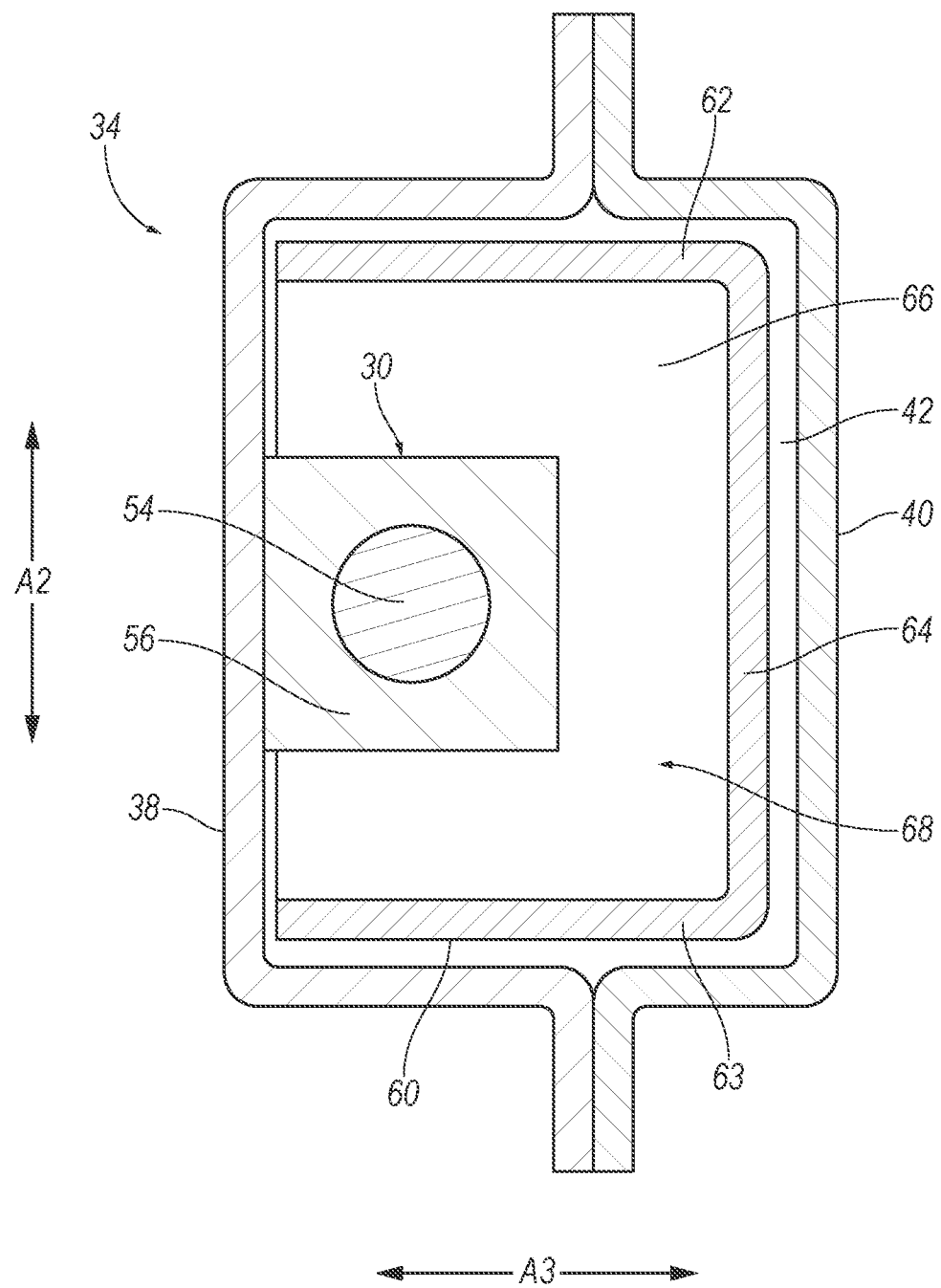
FIG. 4 is a front cross-section of the rocker and the pyrotechnic actuator.
Figure 5:
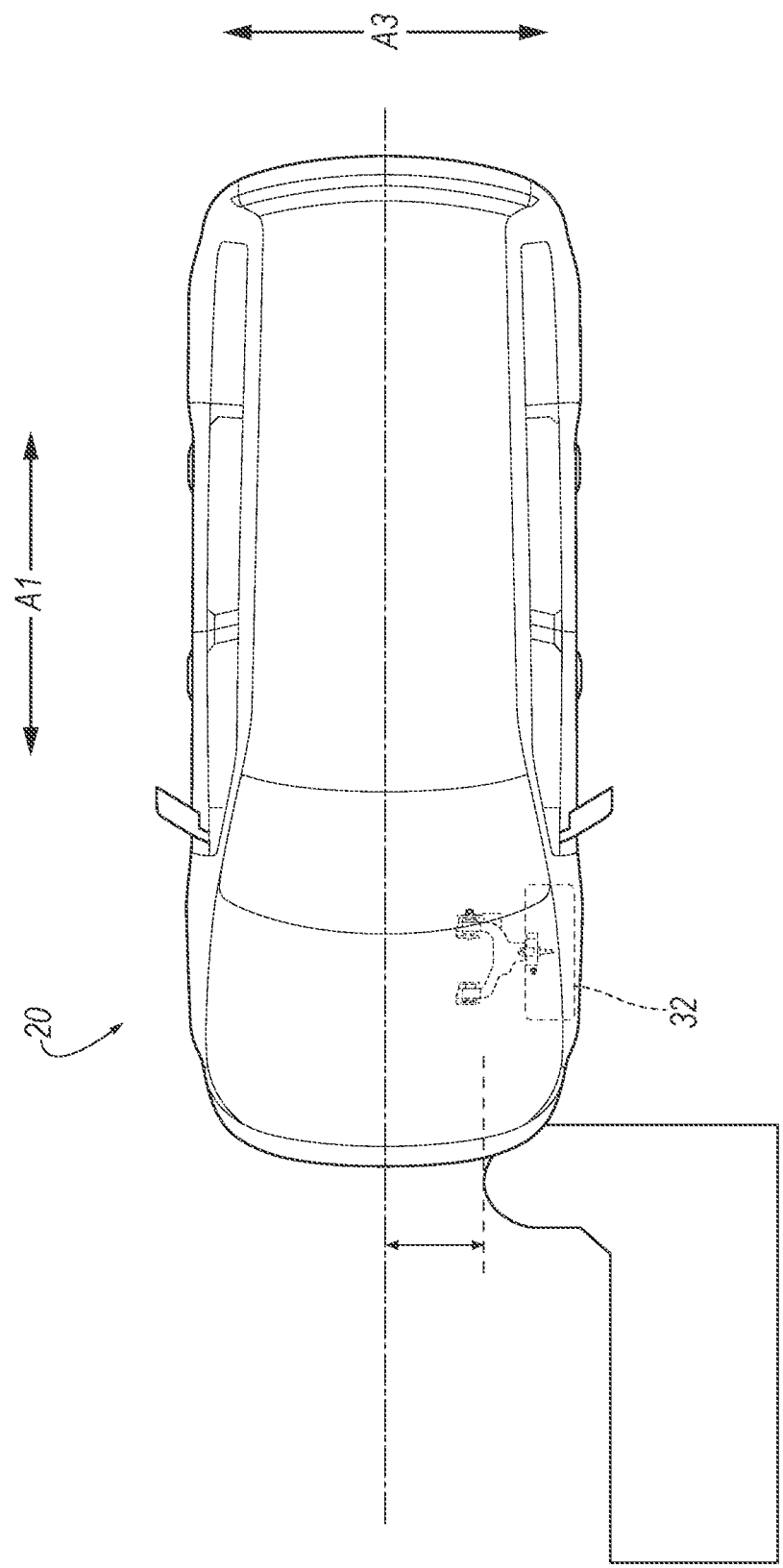
FIG. 5 is a top view of the vehicle during a small-offset rigid-barrier test.

The rocker 34 may include an inner rocker panel 38 and an outer rocker panel 40, as shown in FIG. 4. The inner rocker panel 38 is inboard of the outer rocker panel 40. In such an example, the inner rocker panel 38 and the outer rocker panel 40 may be elongated along the vehicle-longitudinal axis A1 and may define a cavity 42 therebetween. The inner rocker panel 38 and the outer rocker panel 40 may be fixed to each other along the vehicle-longitudinal axis A1, e.g., welded to each other along flanges that are elongated along the vehicle-longitudinal axis A1. The cavity 42 may extend from a front end 44 of the rocker 34 to a rear end 46 of the rocker 34, as shown in FIG. 2. In such an example, the cavity 42 is elongated along the vehicle-longitudinal axis A1 from the front end 44 of the rocker 34 to the rear end 46 of the rocker 34. The front end 44 of the rocker 34 is vehicle-forward of the rear end 46 of the rocker 34. The rocker 34 may include an applique, i.e., a covering, that faces outboard and provides a class-A surface, i.e., a finished surface exposed to view by a customer and free of unaesthetic blemishes and defects.

The vehicle body 22 defines two front wheel wells 24, i.e., a left-front wheel 32 well and a right-front wheel 32 well, that house front wheels 32 of the vehicle 20 and two rear wheel wells that house rear wheels of the vehicle 20. The wheel wells are voids occupied by the wheels 32 of the vehicle 20. The vehicle body 22 includes the rear walls 26 that define front wheel wells 24. The rear walls 26 are vehicle-rearward of the front wheel wells 24. The vehicle 20 may include body panels, cladding, etc., lining the front wheel wells 24, e.g., including the rear walls 26. The front end 44 of the rocker 34 is at the rear wall 26 of the front wheel well 24 and may be directly exposed to the front wheel well 24 or may be concealed by cladding or the like.

Figure 6:
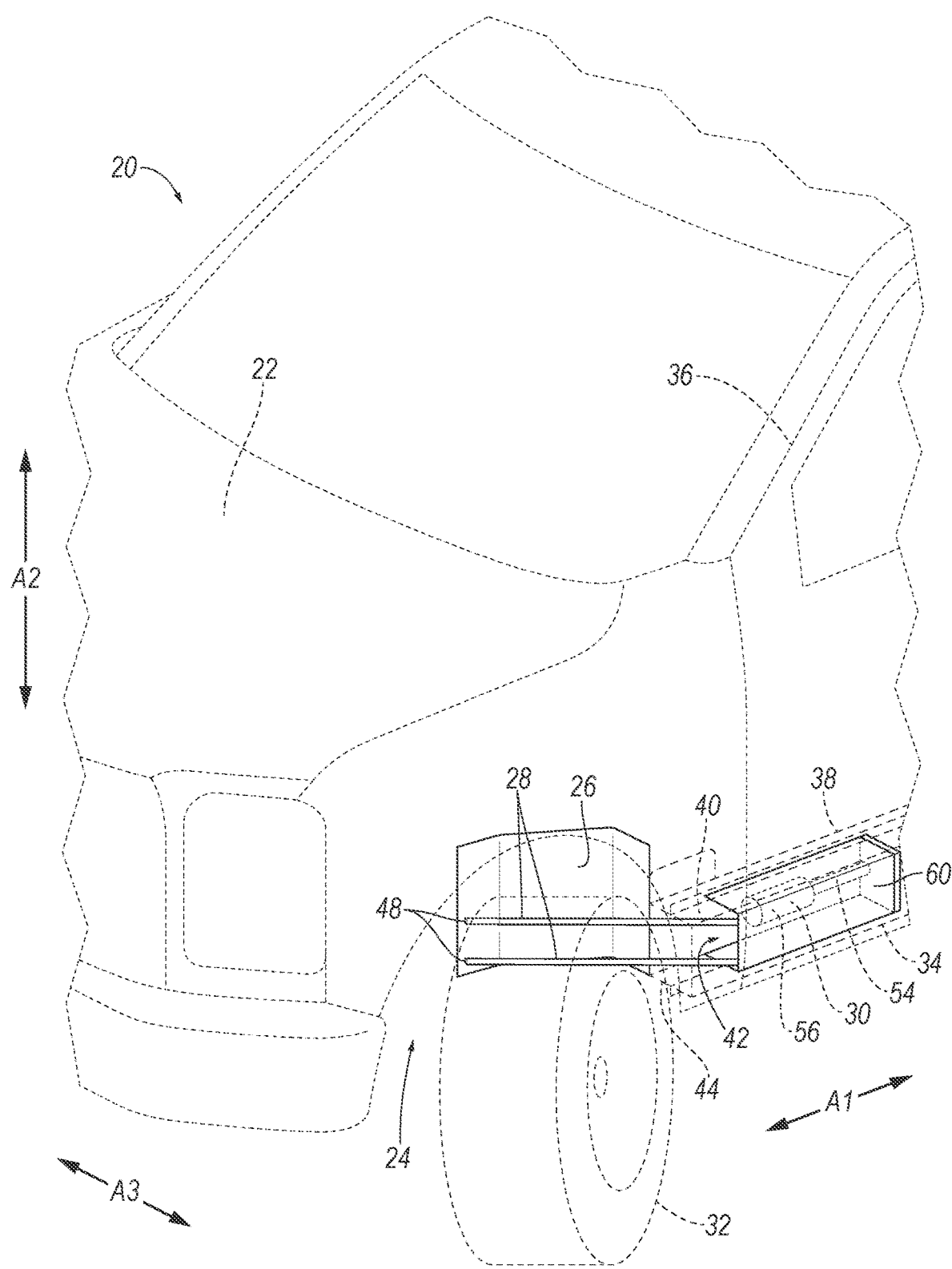
FIG. 6 is a perspective view of the vehicle with the cables in a taut position.
Figure 7:
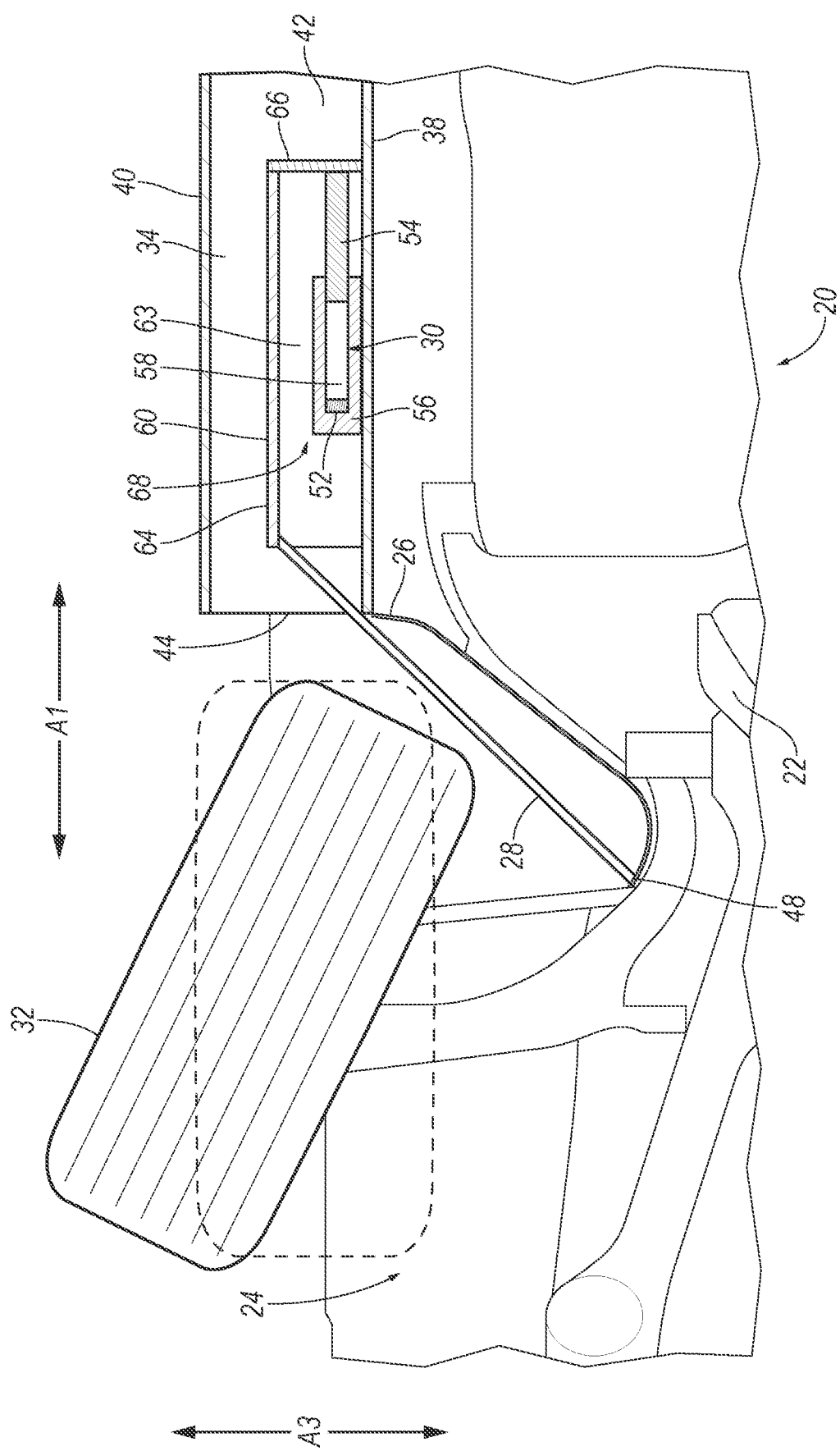
FIG. 7 is a bottom view of the vehicle with the cables in the taut position and a cross-section of the rocker and pyrotechnic actuator.
Figure 8:
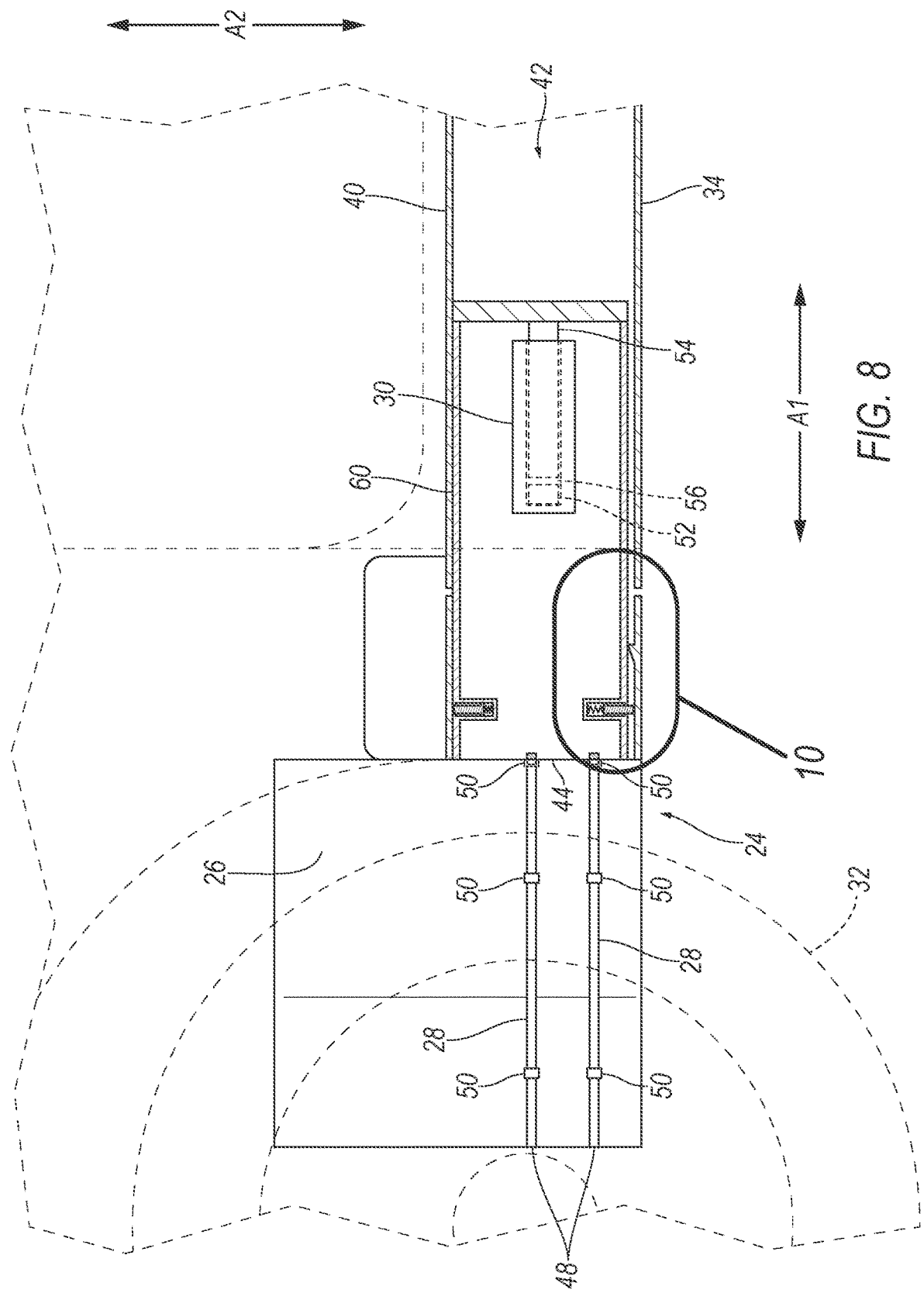
FIG. 8 is a side cross-section of the rocker of the vehicle with the cables in the slack position.
Figure 9:
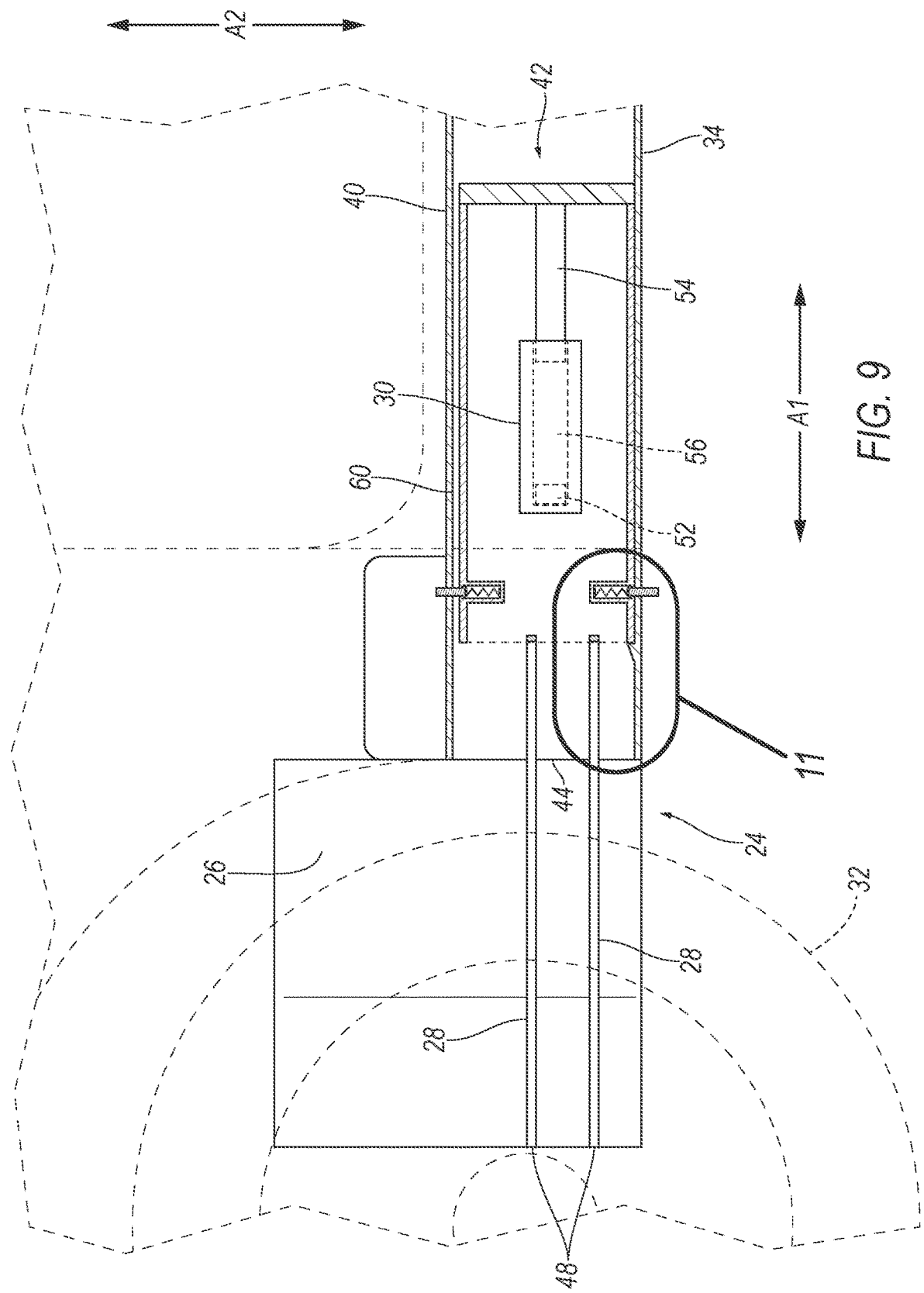
FIG. 9 is a side cross-section of the rocker of the vehicle with the cables in the taut position.

The cables 28 are movable from the slack positions, shown in FIGS. 1, 3, and 8, to the taut positions, shown in FIGS. 6, 7, and 9. The cables 28 in the taut positions may deflect the respective wheel 32 outboard of the wheel 32 well. The cables 28 may be steel, Dyneema®, Kevlar®, or any other material of suitable flexibility and strength to move from the slack positions to the taut positions and to deflect the wheel 32. The cables 28, e.g., at each of the front wheel wells 24, are spaced from each other along a vehicle-vertical axis A2. In other words, one of the of the cables 28 may be separated from and above a second of the cables 28.

In the example shown in the Figures, the cables 28 are supported at the left-front wheel well 24. In other examples, the cables 28 may be at the right-front wheel well in addition to or in the alternative to the cables 28 at the left-front wheel well 24. The cables 28 may be elongated perpendicular to the vehicle-vertical axis A2. For example, the cables 28 may extend along the vehicle-longitudinal axis A1 and a cross-vehicle axis A3, and not along the vehicle-vertical axis A2. As another example, the cable 28 may be elongated in two dimensions along a plane, and the vehicle-vertical axis A2 may extend perpendicular to the plane.

The cables 28 may be fixed to the vehicle body 22, e.g., at the rear wall 26. A distal end 48 of the cable 28 may be fixed, e.g., via weld, fastener, or the like, to the vehicle body 22 inboard of the rear wall 26 of the front wheel well 24. The cables 28, e.g., the distal ends 48 of the cables 28, may be fixed to the vehicle body 22 vehicle-forward of the rear wall 26. The cables 28 may extend from the distal end 48 outboard to the rocker 34, e.g., at the rear wall 26. The cable 28 may be over or under any cladding of the rear wall 26.

The cables 28 in the slack positions are at, e.g., abut, the rear wall 26. The cables 28 may be releasably fixed to the rear wall 26, i.e., such that the cables 28 can move away from the rear wall 26 to the taut position. The cables 28 in the taut positions are vehicle-forward of the cables 28 in the slack positions. The cables 28 in the taut positions are spaced from the rear wall 26, e.g., vehicle-forward of the rear wall 26. The cables 28 in the taut positions extend transversely to both the vehicle-longitudinal axis A1 and the cross-vehicle axis A3. For example, the cables 28 in the taut positions may linearly extend from the distal end 48 rearward and outboard to the rocker 34 at the rear wall 26.

A plurality of retainers 50 may be fixed to the rear wall 26 and engaged with the cables 28 in the slack positions, e.g., holding the cables 28 at the rear wall 26. The retainers 50 may be disengaged from the cables 28. For example, the retainers 50 may extend across the cables 28 in the slack positions, the cables 28 between the retainers 50 and the rear wall 26. The retainers 50 may be releasably fixed to the vehicle body 22, e.g., via frangible fasteners or other suitable structure. The cables 28 in the taut position are disengaged from the plurality of retainers 50. For example, movement of the cables 28 to the taut positions may fracture the fasteners and/or otherwise disengage the retainers 50.

The pyrotechnic actuator 30 generates force, e.g., via increasing in length between opposing ends, upon actuation. The pyrotechnic actuator 30 includes pyrotechnic material 52 that rapidly increases in volume upon actuation, e.g., in response to receiving an electrical pulse. The pyrotechnic material 52 may be combustible to produce gas. The pyrotechnic material 52 may be formed of a solid mixture of substances that, when ignited, react to produce the gas. For example, the pyrotechnic material 52 may be formed of sodium azide (NaNO3), potassium nitrate (KNO3), and silicon dioxide (SiO2), which react to form nitrogen gas (N2). The pyrotechnic actuator 30 may include, for example a piston 54 and a cylinder 56 arrangement. The pyrotechnic material 52 may be in a combustion chamber 58 of the cylinder 56 between the piston 54 and the cylinder 56. Actuation of the pyrotechnic material 52, e.g., in response to receiving an electrical pulse, may generate gas and urge the piston 54 to slide within the cylinder 56 and increase the length of the pyrotechnic actuator 30. The pyrotechnic actuator 30 may include any other suitable structure for generating force from the actuation of the pyrotechnic material 52.

The pyrotechnic actuator 30 is operatively coupled to the cables 28 to move the cables 28 from the slack positions to the taut positions upon actuation of the pyrotechnic actuator 30. For example, force generated from lengthening of the pyrotechnic actuator 30 may move the cables 28 operatively connected thereto to the taut positions. For example, the cables 28 may be connected, e.g., fixed, to a shuttle 60 and the pyrotechnic actuator 30 may be operatively coupled to the shuttle 60 and the vehicle body 22. Actuation of the pyrotechnic actuator 30 may move the shuttle 60 relative to the vehicle body 22, e.g., the cylinder 56 may be fixed to the vehicle body 22 and the piston 54 may be fixed to the shuttle 60.

The shuttle 60 may include a top wall 62, a bottom wall 63, an outboard wall 64, and an end wall 66 defining a hollow 68 therein. The hollow 68 may be open at a front end and at an inboard side of the shuttle 60. The pyrotechnic actuator 30, e.g., the cylinder 56, may be in the hollow 68 and attached to the vehicle body 22 at the open inboard side. The pyrotechnic actuator 30, e.g., the piston 54 may be attached to the end wall 66, e.g., such that actuation of the pyrotechnic actuator 30 applies rearward force to the end wall 66 of the shuttle 60. In addition, or as an alternative, the top, bottom, and/or outboard sides of the shuttle 60 may be open.

The shuttle 60 may be disposed within the rocker 34, e.g., in the cavity 42. The shuttle 60 is slidable from a first position, shown in FIGS. 1, 3, 8, and 10, to a second position, shown in FIGS. 6, 7, 9, and 11. The shuttle 60 is connected to the cables 28, e.g., via weld, fastener, or the like. For example, ends of the cables 28 opposite the distal ends 48 may be fixed to the outboard wall 64. The shuttle 60 in the first position is vehicle-forward of the second position. In other words, the shuttle 60 may move from the first position rearward away from the rear wall 26 of the front wheel well 24 to the second position. The shuttle 60 is movable from the first position to the second position along the rocker 34 of the vehicle body 22. For example, the shuttle 60 may be slidable along the longitudinal axis A1 within the cavity 42 of the rocker 34. The cables 28 are at the slack positions when the shuttle 60 is at the first position and at the taut positions when the shuttle 60 is at the second position. Movement of the shuttle 60 from the first position to the second position may move the cables 28 from the slack positions to the taut positions.

Figure 10:
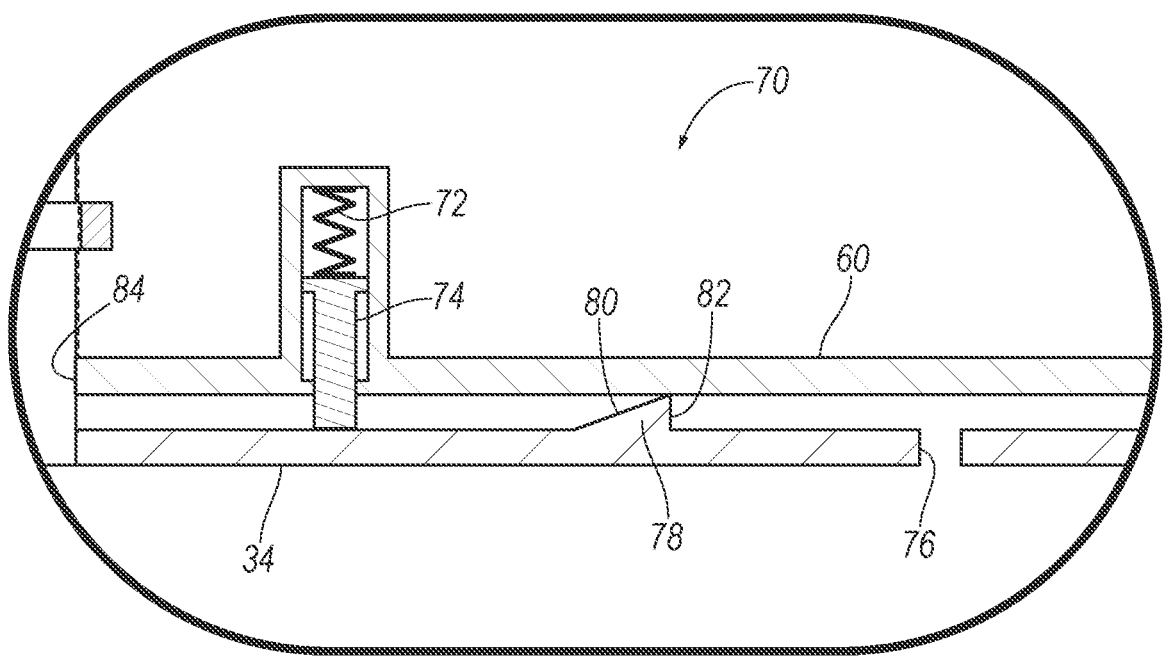
FIG. 10 is an enlarged view of a portion of FIG. 8.
Figure 11:
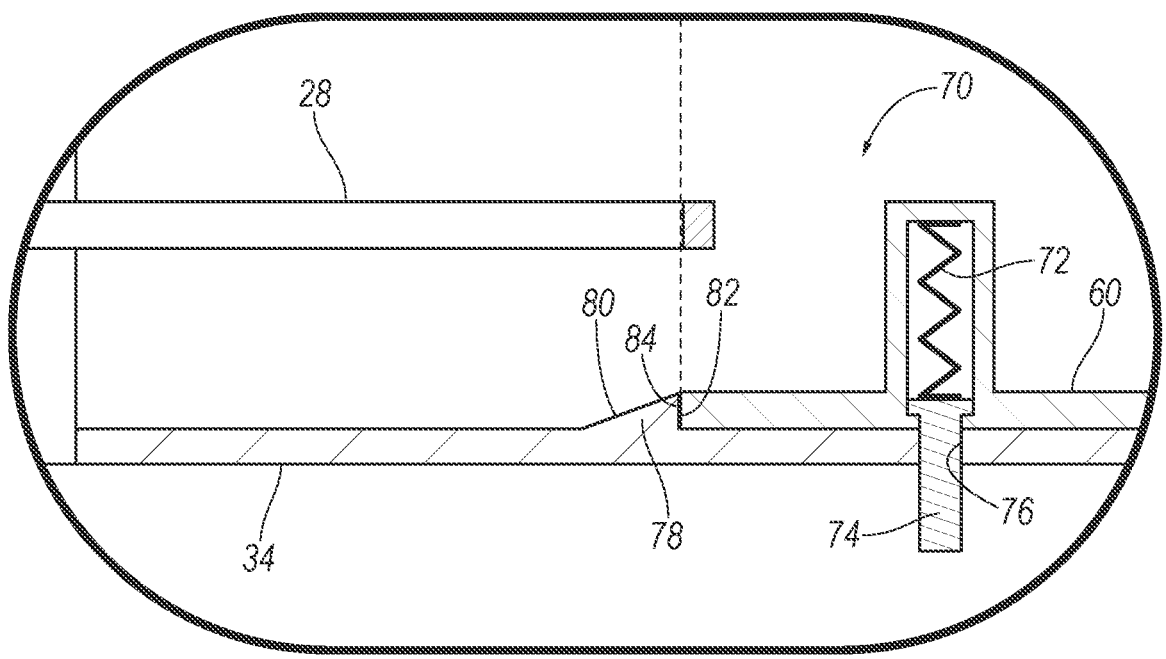
FIG. 11 is an enlarged view of a portion of FIG. 9.

With reference to FIGS. 10 and 11, the vehicle 20 may include a lock 70 engageable with the shuttle 60 at the second position to maintain the shuttle 60 at the second position. For example, the lock 70 may permit movement of the shuttle 60 from the first position to the second position and inhibit movement of the shuttle 60 from the second position to the first position.

The lock 70 may include a spring 72 and pin 74 urged by the spring 72. The spring 72 and pin 74 may be supported by shuttle 60. The rocker 34 may define a hole 76 rearward of the pin 74 when the shuttle 60 is in the first position. The hole 76 may be positioned to receive the pin 74 as the shuttle 60 moves from the first position to the second position. The pin 74 may be completely in the cavity 42 and spaced from the hole 76 when the shuttle 60 is in the first position. The pin 74 may extends put of the cavity 42 and be disposed in the hole 76 defined by the vehicle body 22 when the shuttle 60 is at the second position. The spring 72 may urge the pin 74 into the hole 76. Alternately, the pin 74 and spring 72 may be supported by the vehicle body 22 and the shuttle 60 may define a hole 76 (not shown).

The lock 70 may include a ratchet tooth 78 that permits movement of the shuttle 60 from the first position to the second position and inhibits movement of the shuttle 60 from the second position to the first position. For example, the ratchet tooth 78 may include a rear surface 80 that is transverse, e.g., perpendicular to, the longitudinal axis A1. Normal force generated by the rear surface 80 may be primarily rearward. The ratchet tooth 78 may include a sloped front surface 82. Normal force generated by the front surface 82 may be primary upward. The shuttle 60 at the first position may be on top, or in front, of the ratchet tooth 78. The ratchet tooth 78 may be positioned to engage a vehicle-forward edge 84 of the shuttle 60 at the second position. For example, the rear surface 80 of the ratchet tooth 78 may abut the forward edge of the shuttle 60 at the second position. The ratchet tooth 78 may engage the rear edge at the top wall 62, the bottom wall 63, and the outboard wall 64.

The vehicle 20 can include an impact sensor that is configured to detect an impact to the vehicle 20. The impact sensor may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor may be located at numerous points in or on the vehicle 20.

The vehicle 20 may include a control system including at least one impact sensor for sensing an impact of the vehicle 20, and a controller (e.g., a restraints control module) in communication with the impact sensor and the pyrotechnic actuator 30 for activating the pyrotechnic actuator 30, for example, by providing an impulse to the pyrotechnic material 52 of the pyrotechnic actuator 30, when the impact sensor senses an impact of the vehicle 20.

Upon actuation, gas produced by the pyrotechnic material 52 may urge the piston 54 rearward from the cylinder 56 and apply force to the end wall 66. The force on the end wall 66 may move the shuttle 60 to the second position and the cables 28 to the taut positions. The lock 70 may maintain the shuttle 60 in the second position and the cables 28 in the taut position. The cables 28 in the taut position may urge the wheel 32 outboard out of the front wheel well 24.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A vehicle comprising:
a vehicle body defining a front wheel well, the vehicle body including a rear wall vehicle-rearward of the front wheel well;
a cable supported at the rear wall, the cable movable relative to the vehicle body from a slack position to a taut position;
a pyrotechnic actuator operatively coupled to the cable to move the cable from the slack position to the taut position upon actuation of the pyrotechnic actuator; and
a shuttle connected to the cable and slidable from a first position to a second position, the cable being at the slack position when the shuttle is at the first position and at the taut position when the shuttle is at the second position.

2. The vehicle of claim 1, further comprising a second cable supported at the rear wall, the second cable movable from a second slack position to a second taut position, the pyrotechnic actuator operatively coupled to the second cable to move the second cable from the second slack position to the second taut position upon actuation of the pyrotechnic actuator.

3. The vehicle of claim 2, wherein the cable and the second cable are spaced from each other along a vertical axis.

4. The vehicle of claim 1, wherein the cable is elongated perpendicular to a vehicle-vertical axis.

5. The vehicle of claim 1, wherein the cable in the slack position is at the rear wall and the cable in the taut position is spaced from the rear wall.

6. The vehicle of claim 1, wherein the cable in the taut position is vehicle-forward of the cable in the slack position.

7. The vehicle of claim 1, wherein the cable in the taut position extends transversely to both a vehicle-longitudinal axis and a cross-vehicle axis.

8. The vehicle of claim 1, further comprising a plurality of retainers fixed to the rear wall and engaged with the cable in the slack position.

9. The vehicle of claim 8, wherein the cable in the taut position is disengaged from the plurality of retainers.

10. The vehicle of claim 1, wherein the cable is fixed to the vehicle body vehicle-forward of the rear wall in the slack position and in the taut position.

11. The vehicle of claim 1, wherein the shuttle in the first position is vehicle-forward of the second position.

12. The vehicle of claim 1, wherein the shuttle is movable from the first position to the second position along a rocker of the vehicle body.

13. The vehicle of claim 12, wherein the shuttle is disposed within the rocker.

14. The vehicle of claim 1, wherein the pyrotechnic actuator is operatively coupled to the shuttle and the vehicle body to move the shuttle relative to the vehicle body.

15. The vehicle of claim 1, further comprising a lock engageable with the shuttle in the second position to maintain the shuttle at the second position.

16. The vehicle of claim 1, further comprising a spring and a pin supported by one of the vehicle body and the shuttle, the spring urging the pin toward the other of the vehicle body and the shuttle, and the other of the vehicle body and the shuttle defining a hole positioned to receive the pin as the shuttle moves from the first position to the second position.

17. The vehicle of claim 1, further comprising a ratchet tooth supported by the vehicle body and positioned to engage the shuttle in the second position.

18. The vehicle of claim 17, wherein the ratchet tooth is positioned to engage a vehicle-forward edge of the shuttle at the second position.

* * * * *